United States Patent [19]

Gabriel et al.

[11] Patent Number: 5,482,420
[45] Date of Patent: Jan. 9, 1996

[54] COLLATED SCREW PACKAGE FORMED WITH WELDED WIRES

[75] Inventors: William L. Gabriel; James E. Doherty, both of Barrington, Ill.

[73] Assignee: Illinois Tool Works Inc., Glenview, Ill.

[21] Appl. No.: 337,936

[22] Filed: Nov. 10, 1994

[51] Int. Cl.[6] .............................. F16B 15/08; B65D 85/24
[52] U.S. Cl. ................................ 411/442; 206/345; 470/2; 411/966
[58] Field of Search ........................... 411/442, 443, 411/966; 206/343–347; 470/2

[56] References Cited

U.S. PATENT DOCUMENTS

| | | | |
|---|---|---|---|
| 3,031,670 | 5/1962 | Sillars | 411/442 X |
| 4,836,372 | 6/1989 | Shelton | 206/345 X |
| 4,913,611 | 4/1990 | Leistner | 206/345 X |
| 5,409,111 | 4/1995 | Takumi | 206/344 |

*Primary Examiner*—Neill R. Wilson
*Attorney, Agent, or Firm*—Mark W. Croll; Thomas W. Buckman; John P. O'Brien

[57] ABSTRACT

A collated screw package is formed with a plurality of parallel screws secured to each other with two wires which are sufficiently friable to permit the screws to be singly detached from the package as the screw is driven by a rotary drilling device. The wires are preferably spot welded to unthreaded portions of each screw which prevents fragments of the wires and fragments of the spot welded joints from interfering with the screw threads. To form the unthreaded portions, the thread of each screw is interrupted for a portion to allow at least one of the wires to be secured to the screw shank at the interruption. The interruption is formed by a relief in a continuous surface of thread forming tooling.

13 Claims, 1 Drawing Sheet

5,482,420

COLLATED SCREW PACKAGE FORMED WITH WELDED WIRES

TECHNICAL FIELD

The present invention relates generally to improved screw packages particularly suited for handling a plurality of screws and positioning them individually over a desired point of installation. More particularly, the invention relates to an improved collated screw package wherein welded wires are used to maintain a collated system of screws together in the package.

BACKGROUND ART

Various forms of strap fastener assemblages have been developed for preferred use with an automatic fastener driver. In one particular type of assemblage, such as disclosed in FIGS. 29 and 30 of U.S. Pat. No. 5,005,699, a plurality of collated screws are secured together with a pair of parallel connecting wires arranged with a predetermined spacing along the axes of the wires. Points of contact between the thread of each screw and the wires are joined by spot welding.

There are difficulties associated with the aforementioned screw package. For example, since the wires are secured directly to the threads by means of spot welded joints, the random screw thread surface yields a typical lack of uniformity in weld quality. For example, one screw may be rotated so that the weld electrode or wheel for the weld wire is on a valley between two threads, and thus the wire does not touch the screw and no weld is made. On a subsequent screw, the weld wheel may hit a peak of a thread, and sever the weld wire.

This leads to subsequent difficulty with power tool interface. In other words, some screws may not be attached to the weld wire at all. In subsequent screws, fragments of the wires may stay with or break free from the threads. Those wire segments that break free can inhibit consecutive screws from proper indexing forward in the tool. Also, the wire segments that remain attached to the threads create discontinuity and inhibit smooth interface of the threads with wood fiber in a secure fastening operation.

It is accordingly one object of the present invention to provide a screw package wherein a plurality of screws are held together in collated alignment with a frangible material that does not interface with the threads.

Another object is to provide for a collated screw package in which wires are spot welded in a manner guaranteeing consistent spot welds irrespective of thread specifications.

DISCLOSURE OF THE INVENTION

A screw package comprises at least two screws and at least two frangible members respectively connected to secure said screws in predetermined positions relative to each other. In accordance with the invention, the points of attachment between each screw and each frangible member occurs in an unthreaded portion of the screw. This type of interface advantageously prevents damage to the screw threads from fragments of the frangible members remaining within the unthreaded portions as each screw is removed from the package.

In the preferred embodiment, the frangible members are wires secured to the screws.

In accordance with another feature of this invention, the thread of each screw is interrupted for a portion to allow for at least one of the wires to be secured to the screw shank at the interruption. Preferably, the interruption is formed by a relief in a continuous surface of thread forming tooling used to form the helical screw thread.

In a preferred embodiment, the length of the interruption is at least equal to the width of the weld electrode or wheel used to spot weld the wire to the screws.

In one embodiment, the interruption may have a length along the screw shank equal to about one to four threads.

In the preferred embodiment, the wires are spot welded to the screw within the unthreaded portions thereof. Securement of the wire within the unthreaded portions advantageously guarantees consistent spot welds.

A method of forming a collated screw package is also disclosed. In accordance with the method of this invention, a plurality of screws are manufactured by means of thread forming tooling, whereby the otherwise continuous surface of the tooling is formed with a relief to create an interruption or unthreaded portion within the threaded portion of the screw. Preferably, but not necessary, this unthreaded portion is bounded at opposite ends thereof with threaded portions. Thereafter, a weld wire is secured to the unthreaded portion of each screw, preferably by spot welding, and a second weld wire is secured to the screw shank between the threaded portion and the screw head to complete the package.

In accordance with another feature of both the screw package and method of manufacturing same in accordance with this invention, the wire diameter and spot weld size are selected to avoid projecting radially outward from the pitch diameter of the adjacent threaded portion.

With the screw package thusly formed in accordance with the invention, a plurality of screws are held together in collated alignment with the frangible welded wires. The overall package is easily manipulated to position an individual screw over a desired point for installation and held there by grasping the package or a handle thereon as the screw is driven and separated from the package while it is being driven. A powered screwdriver or rotary drilling device first moves axially to break the end screw away from the collation and then rotates the screw to screw it into a substrate, such as for attachment of plywood to wooden supports for sub-flooring.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
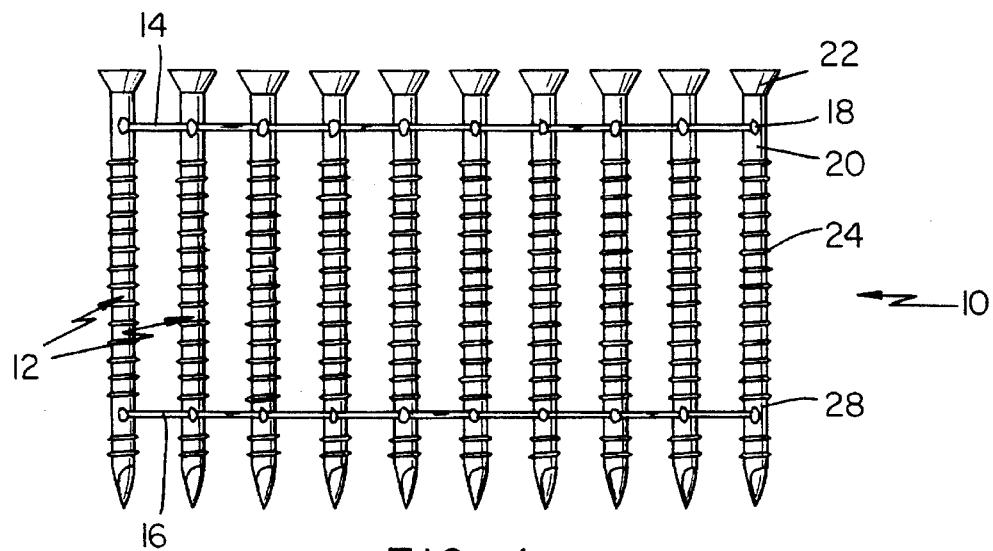
FIG. 1 is a side elevation view of a collated screw package in accordance with the present invention.
Figure 2:
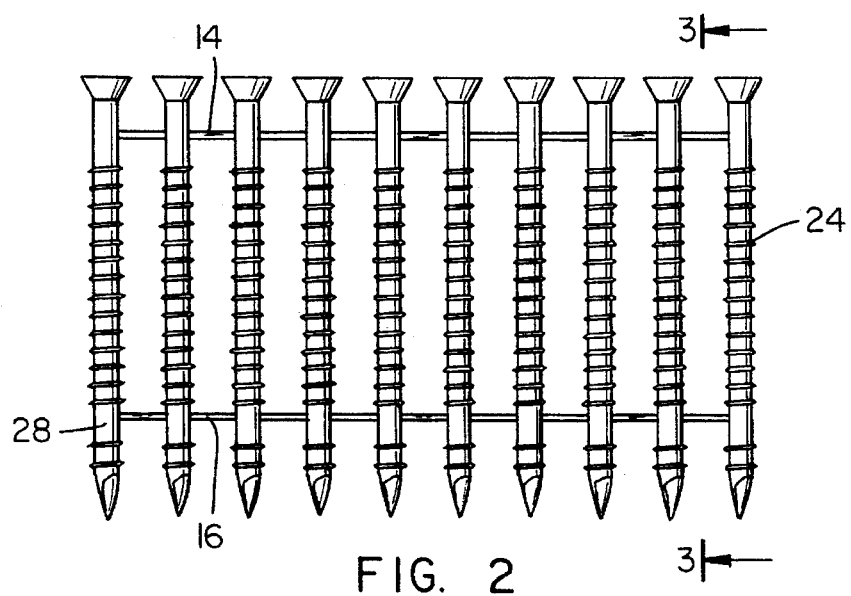
FIG. 2 is a rear view of the side elevation view of FIG. 1.
Figure 3:
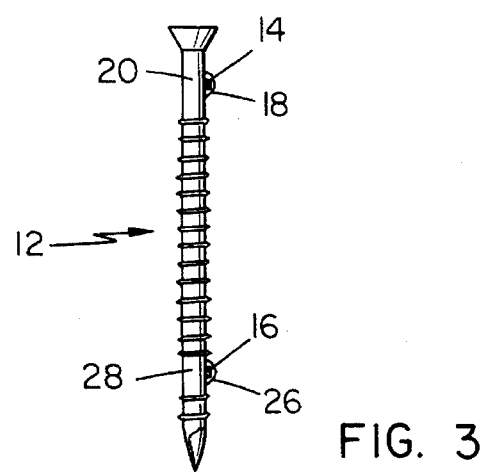
FIG. 3 is a sectional view taken along the line 3—3 of FIG. 1.

Referring to FIGS. 1–3, a preferred embodiment of a collated screw package, generally designated with reference numeral 10, comprises a plurality of screws 12 which may be of a self-drilling, self-tapping type, that are preferably maintained in parallel spaced relation to each other with a pair of wires 14 and 16 respectively spot welded to unthreaded portions of each screw. Wires 14,16 function as a frangible material that is easily manipulated to position an individual screw over a desired point for installation with a rotary drilling device such as a powered screwdriver, as discussed more fully below.

The upper wire 14 is spot welded at 18 to an unthreaded portion 20 of each screw extending between a tapered lower portion of the screw head 22 and the threaded portion 24 of the screw extending along a major portion of the screw shank. The lower wire 16 is spot welded at 26 to each screw 12 within an unthreaded portion 28 that is preferably formed as an interruption or land in the helical screw thread 24. In the preferred embodiment, this interruption a land is formed from a relief in a continuous surface of thread forming tooling (not shown in detail), such tooling being conventionally used to form the helical screw thread. The interruption 28 may have a length corresponding to, for example, one to four threads.

The interruption or land 28 is sufficiently long to allow the weld electrode or wheel 30 (See FIG. 3) that is used to weld the wire to the screw to consistently engage the screw to create a uniform spot weld on each screw. In a preferred embodiment, the weld wire 16 has a diameter that is less than the depth of the threads of the threaded portion of the screw. Accordingly, absent an interrupt or land 28, the weld wheel 30 may contact a screw by its outer edges touching the tops of a pair of threads, and thus the weld wire in the middle of the wheel 30 would not contact the screw sufficiently to obtain a good weld. Alternatively, on another screw, a peak of a thread may hit the center of the weld wheel and sever the weld wire.

The upper and lower welded wires 14,16 impart sufficient rigidity to the collated screw package 10 while enabling individual orientation of each screw 12 over a desired point of application. During use, therefore, the package 10 of the invention is positioned on the work area in such a way that a corner or end screw is located over an intended point of application. The tip of a rotary drilling device (powered or manually operated) is then fitted into the driving recess pocket or slot in the screw head. The drilling device is then actuated to first move axially to break the end screw away from the collation. The screw is then rotated to screw it into, for example, a wooden substrate such as plywood secured to wooden supports for a sub-flooring.

Since the welded wires 14,16, particularly the lower welded wire 16, are secured to an unthreaded portion formed as an interrupt or land 28 within the threaded portion 24 of the screw, any fragments of the wires and fragments of the spot welded joints 18,26 remaining with the screw after separation from the package are advantageously located to avoid damage to the threaded screw portions. The feature of providing these unthreaded portions 28 has the effect of defining uniform lands that interface with the welded wire 16 to guarantee consistent spot welds by creating enough room for the weld electrode or wheel 30, thereby ensuring that the wire is uniformly welded to each of the screws.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A screw package, comprising at least two screws, each screw having a shank, a threaded portion and at least two unthreaded portions, and at least two wires respectively connected to secure said screws in predetermined positions relative to each other, wherein points of attachment between each screw and each wire respectively occur in said unthreaded portions of the screw.

2. The screw package of claim 1, wherein the threaded portion of each screw is interrupted to create one of said unthreaded portions to allow for at least one of said wires to be secured to the screw shank at the interruption.

3. The screw package of claim 2, wherein each said wire is spot welded to the screw.

4. The screw package of claim 1, wherein each said wire is spot welded to the screw.

5. The screw package of claim 2, wherein said interruption is formed by a relief in a continuous surface of thread forming tooling used in the manufacture of said threaded screws.

6. The screw package of claim 2, wherein said wire has a diameter less than the depth of the threads in said threaded portion.

7. A screw package, comprising at least two screws and at least two frangible members respectively connected to secure said screws in predetermined positions relative to each other, wherein points of attachment between each screw and each frangible member respectively occur in unthreaded portions of the screw.

8. The screw package of claim 7, wherein said frangible members are wires spot welded to said screws.

9. The screw package of claim 8, wherein said screw threads have a depth and said wires have a diameter less than the depth of the threads.

10. A method of manufacturing a collated screw package, comprising the steps of:

(a) manufacturing a plurality of screws, each screw having a screw head at one end thereof and a threaded portion at the other end thereof;

(b) forming an unthreaded portion within each threaded portion over a predetermined length thereof such that the unthreaded portion is bounded at opposite ends thereof with threads; and (c) attaching a frangible material to each unthreaded portion and further attaching another frangible material to another unthreaded portion of each screw located between the screw head and the threaded portion.

11. The method of claim 10, wherein the unthreaded portion is formed by a relief in a continuous surface of thread forming tooling used to form the threaded portions within each screw.

12. The method of claim 10, wherein the frangible material and the said another frangible material are wires spot welded to the unthreaded portion and said another unthreaded portion.

13. The method of claim 12, wherein the diameter of the welded wire secured within said unthreaded portion and the height of the spot weld are formed so that both the wire and the spot weld do not project radially outward from the surrounding threads.

* * * * *